United States Patent
Tian et al.

(10) Patent No.: US 11,622,221 B2
(45) Date of Patent: Apr. 4, 2023

(54) METHOD AND APPARATUS FOR REPRESENTING SPACE OF INTEREST OF AUDIO SCENE

(71) Applicant: TENCENT AMERICA LLC, Palo Alto, CA (US)

(72) Inventors: Jun Tian, Belle Mead, NJ (US); Shan Liu, San Jose, CA (US); Xiaozhong Xu, State College, PA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 17/489,212

(22) Filed: Sep. 29, 2021

(65) Prior Publication Data
US 2022/0360929 A1 Nov. 10, 2022

Related U.S. Application Data

(60) Provisional application No. 63/184,571, filed on May 5, 2021.

(51) Int. Cl.
*H04S 7/00* (2006.01)
*G06F 16/783* (2019.01)

(52) U.S. Cl.
CPC .......... *H04S 7/302* (2013.01); *G06F 16/7834* (2019.01); *H04S 7/301* (2013.01)

(58) Field of Classification Search
None
See application file for complete search history.

(56) References Cited

U.S. PATENT DOCUMENTS

| | | |
|---|---|---|
| 2005/0143991 A1 | 6/2005 | Chen et al. |
| 2007/0168191 A1 | 7/2007 | Bodin et al. |
| 2015/0026709 A1 | 1/2015 | Falcon |
| 2015/0146873 A1 | 5/2015 | Chabanne et al. |
| 2017/0180905 A1 | 6/2017 | Purnhagen et al. |

OTHER PUBLICATIONS

International Search Report and Written Opinion dated Dec. 27, 2021 in International Patent Appplication No. PCT/US2021/053000, 13 pages.
"Multichannel stereophonic sound system with and without accompanying picture," International Telecommunication Union, Geneva, 2012 (25 pages).

*Primary Examiner* — James K Mooney
(74) *Attorney, Agent, or Firm* — ArentFox Schiff LLP

(57) ABSTRACT

Aspects of the disclosure include methods, apparatuses, and non-transitory computer-readable storage mediums for representing a space of interest of an audio scene. One apparatus includes processing circuitry that decodes audio scene data for the audio scene. The audio scene data includes (i) audio content for a plurality of items representing the audio scene and (ii) a first syntax element indicating a type of a subset of the plurality of items. The subset of the plurality of items represents the space of interest of the audio scene. The processing circuitry determines a part of the audio content for the subset of the plurality of items based on the type of the subset of the plurality of items indicated in the first syntax element. The processing circuitry renders the determined part of the audio content.

15 Claims, 6 Drawing Sheets

METHOD AND APPARATUS FOR REPRESENTING SPACE OF INTEREST OF AUDIO SCENE

INCORPORATION BY REFERENCE

The present application claims the benefit of priority to U.S. Provisional Application No. 63/184,571, "REPRESENTING SPACE OF INTEREST OF AUDIO SCENE," filed on May 5, 2021, which is incorporated by reference herein in its entirety.

TECHNICAL FIELD

The present disclosure describes embodiments generally related to audio scene representation.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A region of interest (ROI) is a region of samples within a data set identified for a particular purpose. The concept of an ROI is commonly used in many application areas such as medical imaging, geographical information systems, computer vision, optical character recognition, and the like.

While a ROI can be used on a one dimensional audio signal, in an audio scene such a concept may not be directly applied. In this disclosure, methods of representing a space of interest of an audio scene are provided.

SUMMARY

Aspects of the disclosure provide apparatuses for representing a space of interest of an audio scene. One apparatus includes processing circuitry that decodes audio scene data for the audio scene. The audio scene data includes (i) audio content for a plurality of items representing the audio scene and (ii) a first syntax element indicating a type of a subset of the plurality of items. The subset of the plurality of items represents the space of interest of the audio scene. The processing circuitry determines a part of the audio content for the subset of the plurality of items based on the type of the subset of the plurality of items indicated in the first syntax element. The processing circuitry renders the determined part of the audio content.

In one embodiment, the first syntax element indicates that the type of the subset of the plurality of items is one of a type associated with a listener space, a type associated with an audio channel configuration, or a type associated with an audio object configuration.

In one embodiment, the audio scene data includes a second syntax element indicating a number of the subset of the plurality of items.

In one embodiment, the second syntax element indicates the number of the subset of the plurality of items is greater than one, and the audio scene data includes a third syntax element indicating an identification index for each of the subset of the plurality of items.

In one embodiment, the first syntax element indicates the type of the subset of the plurality of items is the type associated with the listener space, and the audio scene data includes a fourth syntax element indicating whether a subtype of the listener space is signaled.

In one embodiment, the fourth syntax element indicates that the subtype of the listener space is signaled, and the audio scene data includes a fifth syntax element indicating the subtype of the listener space.

In one embodiment, the fourth syntax element indicates that the subtype of the listener space is not signaled, and the subtype of the listener space is determined based on a video scene.

In one embodiment, the subtype of the listener space is one of a type associated with a sweet spot of the audio scene or a type associated with an auditory space.

Aspects of the disclosure provide methods for representing a space of interest of an audio scene. In one method, audio scene data for the audio scene is decoded. The audio scene data includes (i) audio content for a plurality of items representing the audio scene and (ii) a first syntax element indicating a type of a subset of the plurality of items. The subset of the plurality of items represents the space of interest of the audio scene. A part of the audio content is determined for the subset of the plurality of items based on the type of the subset of the plurality of items indicated in the first syntax element. The determined part of the audio content is rendered.

Aspects of the disclosure also provide non-transitory computer-readable mediums storing instructions which when executed by at least one processor cause the at least one processor to perform any one or a combination of the methods for representing a space of interest of an audio scene.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

I. Representation of Space of Interest of an Audio Scene

It is noted that methods included in this disclosure can be used separately or in combination. The methods can be used in part or as a whole.

According to aspects of the disclosure, a space of interest can be defined as a border of space under consideration in an audio scene. The space of interest can be utilized in audio coding, audio processing, audio rendering, and the like.

An audio scene is a semantically consistent sound segment that is characterized by one or more dominant sources of sound. The audio scene can be modeled as a collection of sound sources. In some embodiments, the audio scene can be dominated by a subset of the collection of sound sources.

In some embodiments, the space of interest can be represented by a space where a listener can move to. For example, an entire space can be divided into one or more regions that the listener can move to and other regions that the listener cannot move to. The space of interest can therefore be represented by a collection of the regions that the listener can move to.

In one embodiment, the space of interest can be represented by a sweet spot(s) of the audio scene, where an individual (e.g., the listener) can be fully capable of hearing an audio mix generated by an audio mixer in a way that it is intended to be heard.

Figure 1:
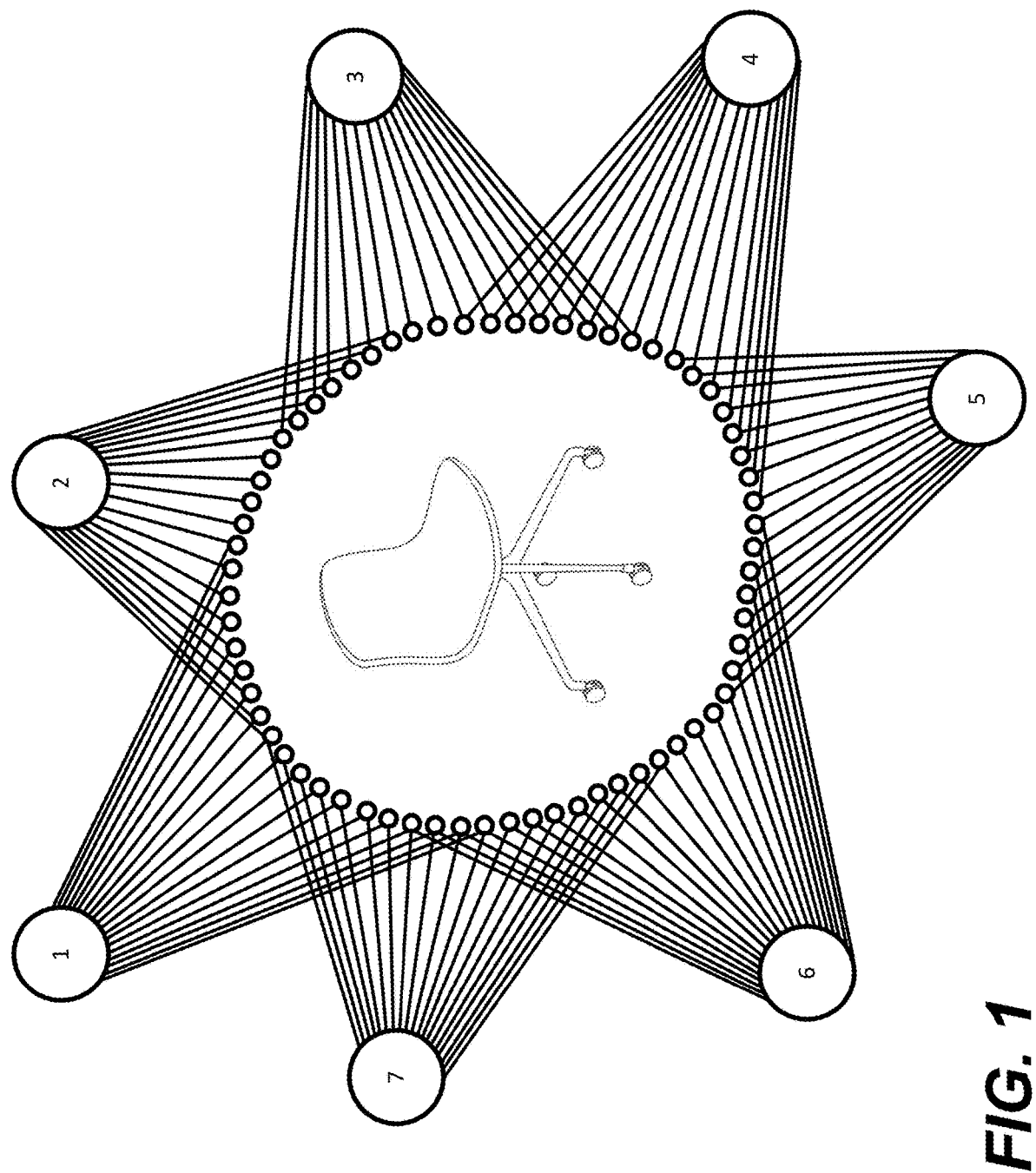
FIG. 1 shows exemplary sweet spots of an audio scene according to an embodiment of the disclosure.

FIG. 1 shows exemplary sweet spots of an audio scene according to an embodiment of the disclosure. In FIG. 1, the sweet spots of the audio scene are the intersection of areas covered by audio sources labeled from 1~7. Thus, the sweet spots are indicated by a circle around a chair in FIG. 1. In some cases such as international recommendations, the sweet spot is referred to as a reference listening point.

In some embodiment, the space of interest can be represented by an auditory space.

In one embodiment, the space of interest can be represented by the auditory space with a limited range of elevation. For example, the space of interest can be represented by two numbers, where the auditory space is within the elevation between these two numbers.

Figure 2:
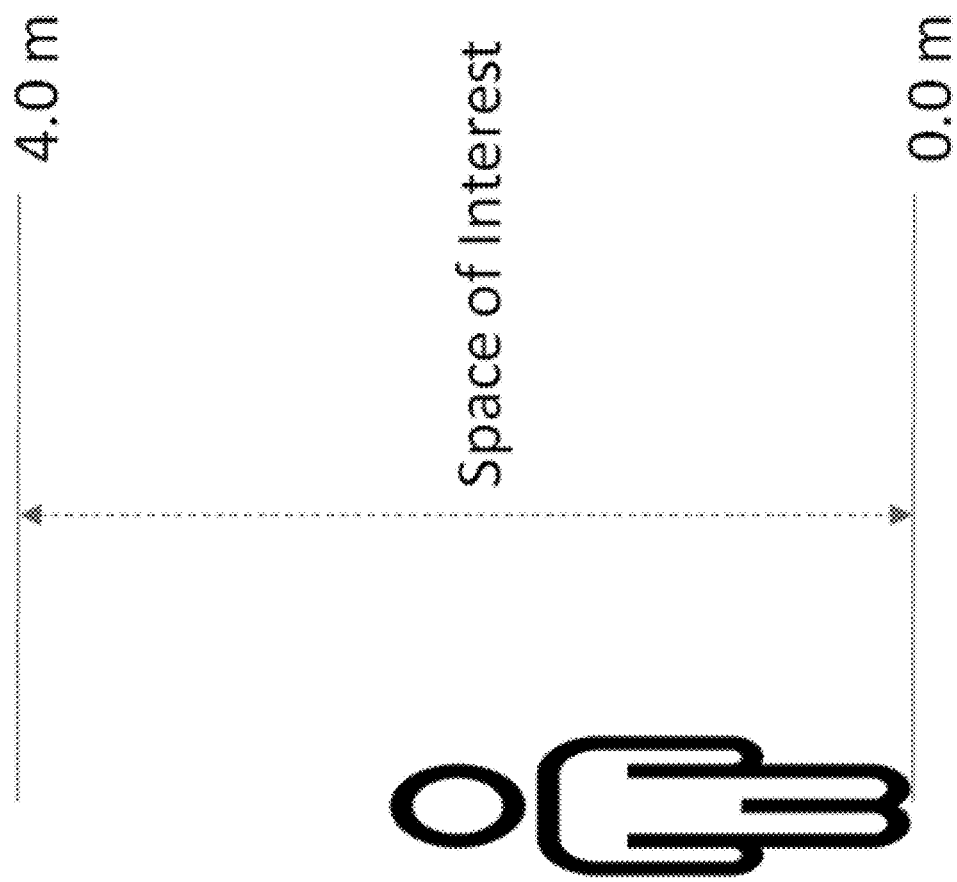
FIG. 2 shows an example of an auditory space with a limited range of an elevation according to an embodiment of the disclosure.

FIG. 2 shows an example of an auditory space with an elevation between 0.0 meter and 4.0 meter.

In one embodiment, the space of interest can be represented by the auditory space with a rectangular prism. The representation can be coordinates of two diagonal vertices of the rectangular prism. The representation can be the co-ordinates of one vertex of the rectangular prism, and values of height, width, and length of the rectangular prism. In some cases, the rectangular prism may not be always vertical or horizontal, so directionality information of the rectangular prism can be described.

In one embodiment, the space of interest can be represented by the auditory space with a polyhedron shape. The representation can be co-ordinates of vertices of the polyhedron shape. The representation can be a collection of surfaces of the polyhedron shape.

Figure 3:
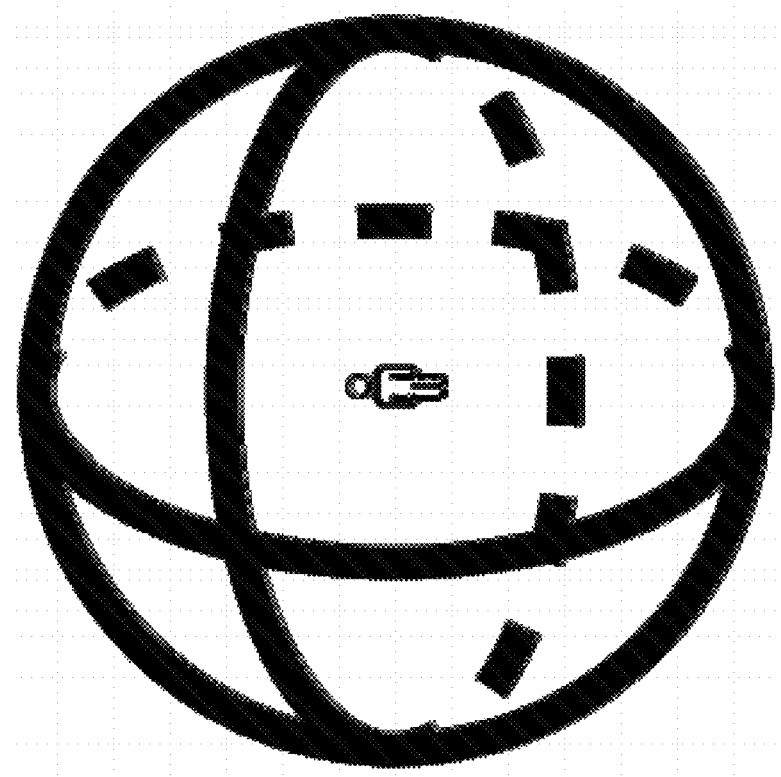
FIG. 3 shows an example of an auditory space with a ball shape according to an embodiment of the disclosure.

In one embodiment, the space of interest can be represented by the auditory space with a ball shape centered at a listener's location, as shown in FIG. 3. The representation can be coordinates of the center of the ball shape, and a value of a radius of the ball shape.

Figure 4:
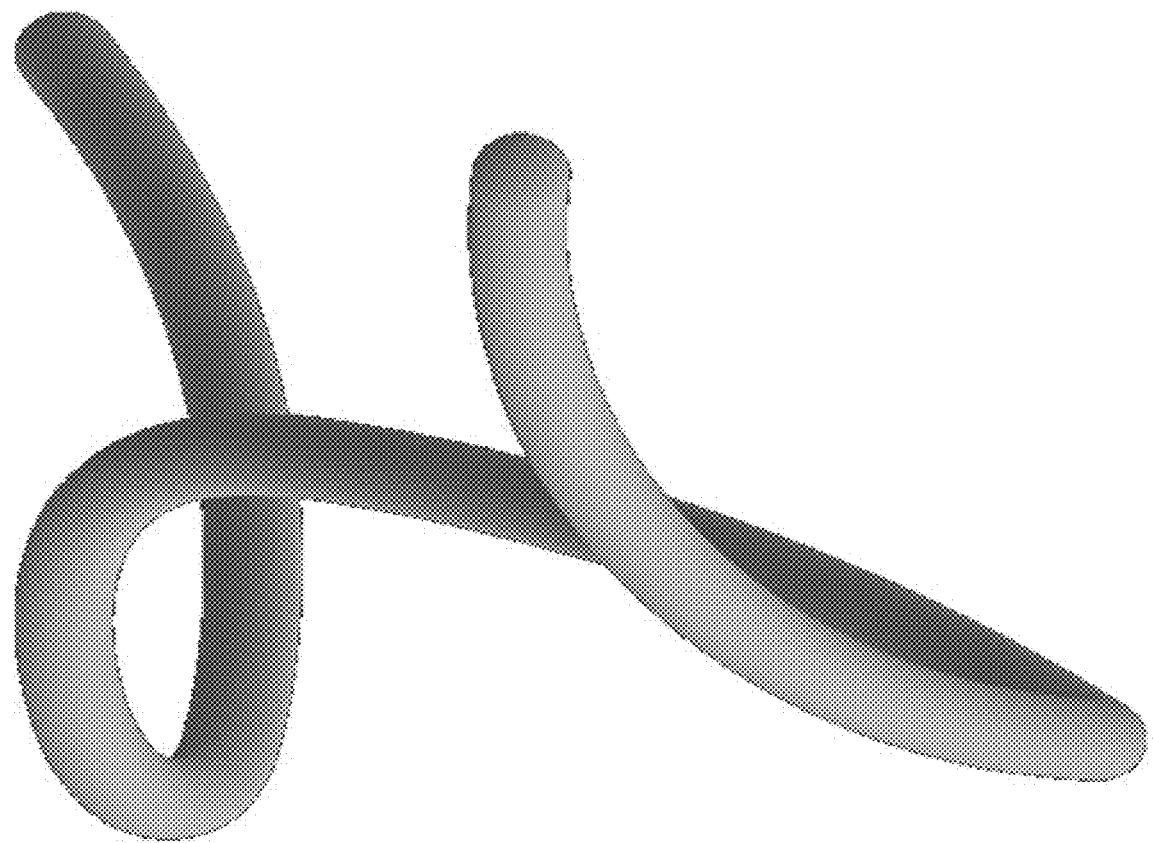
FIG. 4 shows an example of an auditory space with a rolling ball shape according to an embodiment of the disclosure.

In one embodiment, the space of interest can be represented by the auditory space with a rolling ball shape. The center of the rolling ball shape is along a walking path of a listener, as shown in FIG. 4. The representation can be a function describing the walking path, and the radius of the rolling ball shape.

In one embodiment, the space of interest can be represented by a combination of audio channels out of a multi-channel audio. For example, the representation can be a set of the front-left and front-right channels out of a 7.1 audio channel.

In one embodiment, the space of interest can be represented by a combination of audio objects. For example, a hospital audio scene can include audio objects of door, table, chair, TV, radio, doctor, and patient. The space of interest in this example can be represented by a set of the door, doctor, and patient.

According to aspects of the disclosure, the space of interest can be represented by a collection of two or three types of items from the space where the listener can move to (which is referred to as a listener space), the audio channel, and the audio object. That is, the space of interest of the audio scene can be represented by a collection of listener spaces, audio channels, and/or audio objects.

In some embodiments, a first syntax element in audio scene data such as space_of_interest_type flag can be signaled to indicate whether the space of interest is a listener space, an audio channel configuration, or an audio object configuration.

In some embodiments, a second syntax element in the audio scene data of the audio scene can be signaled to indicate a number of each type of items. For example, the second syntax element can be one of three values listener_space_count, audio_channel_config_count, and audio_object_config_count, which indicate the number of listener spaces, audio channel configurations, and audio object configurations, respectively.

In one embodiment, when the listener space is not present in the space of interest of the audio scene, the value of listener_space_count can be set as 0.

In one embodiment, when the audio channel configuration is not present in the space of interest of the audio scene, the value of audio_channel_config_count can be set as 0.

In one embodiment, when the audio object configuration is not present in the space of interest of the audio scene, the value of audio_object_config_count can be set as 0.

In some embodiments, when the second syntax element indicates that a total number of a same type of items is greater than 1, a third syntax element in the audio scene data of the audio scene can be signaled to indicate an identification index for each of the same type of items.

In one embodiment, when listener_space_count is greater than one, the third syntax element can be listener_space_id, which can be signaled to indicate an identification index of each listener space.

In one embodiment, when listener_space_count is equal to one, there is exactly one listener space in the space of interest of the audio scene.

In one embodiment, when audio_channel_config_count is greater than one, the third syntax element can be audio_channel_config_id, which can be signaled to indicate an identification index of each audio channel configuration.

In one embodiment, when audio_channel_config_count is equal to one, there is exactly one audio channel configuration in the space of interest of the audio scene.

In one embodiment, when audio_object_config_count is greater than one, the third syntax element can be audio_object_config_id, which can be signaled to indicate an identification index of each audio object configuration.

In one embodiment, when audio_object_config_count is equal to one, there is exactly one audio object configuration in the space of interest of the audio scene.

According to aspects of the disclosure, audio and video signals can be correlated. Therefore, a listener space of an audio scene can be set according to a corresponding video scene.

In one embodiment, a listener space of an audio scene can be set identical to an ROI of a video scene.

In one embodiment, a listener space of an audio scene can be a portion of an ROI of a video scene.

In one embodiment, a listener space of an audio scene can be outside an ROI of a video scene.

In one embodiment, a fourth syntax element in the audio scene data of the audio scene such as listener_space_flag can be signaled to indicate a relationship between a listener space of the audio scene and other components, such as a video scene. If the fourth syntax element listener_space_flag is set as true, it means the listener space is an audio listener space, and can be fully represented in subsequent syntax elements such as a fifth syntax element listener_space_subtype. If the fourth syntax element listener_space_flag is set as false, it means that the listener space of the audio scene can be inferred from elsewhere without signaling. For example, the listener space of the audio scene can be identical to an ROI of the video scene in the audio-video scene, and the listener space of the audio scene can be copied from the ROI of the video scene.

For a listener space item, the fifth syntax element listener_space_subtype can be signaled to indicate that the item is one of a sweet spot(s), an auditory space with a limited range of elevation, an auditory space with a rectangular prism, an auditory space with a polyhedron shape, an auditory with a ball shape, an auditory with a rolling ball shape, or the like.

Table 1 shows an example syntax table representing the space of interest of an audio scene. In Table 1, the syntax element space_of_interest_type indicates a type of an item in the space of interest for an audio scene. The type of the item can be one of a listener space, an audio channel configuration, or an audio object configuration. The syntax elements listener_space_count, audio_channel_config_count, audio_object_config_count indicate a total number of the listener space, a total number of the audio channel configuration, a total number of audio object configurations, respectively. The syntax elements listener_space_id, audio_channel_config_id, audio_object_config_id indicate an identification index of the listener space, an identification index of the audio channel configuration, an identification index of the audio object configuration, respectively. The syntax element listener_space_flag indicates whether a listener space can be represented by a subtype of the listener space. The syntax element listener_space_subtype indicates a subtype of a listener space. The subtype of the listener space can be one of a sweet spot(s), an auditory space with a limited range of elevation, an auditory space with a rectangular prism, an auditory space with a polyhedron shape, an auditory with a ball shape, an auditory with a rolling ball shape, or the like.

TABLE 1

| name | description |
| --- | --- |
| space_of_interest_type | type of an item in the space of interest: a listener space, audio channel configuration, audio object configuration |
| listener_space_count | total number of listener spaces |
| audio_channel_config_count | total number of audio channel configurations |
| audio_object_config_count | total number of audio object configurations |
| listener_space_id | identification index of a listener space |
| audio_channel_config_id | identification index of an audio channel configuration |
| audio_object_config_id | identification index of an audio object configuration |
| listener_space_flag | a Boolean flag to signal where it is a listener space |
| listener_space_subtype | Subtype of a listener space |

For an audio encoder, decoder, renderer, or other processor, a fixed length flag space_of_interest_selection can be signaled for each listener space, audio channel, and audio object to indicate whether or not the corresponding item is enabled for the given audio encoder, decoder, renderer, or other processor. For example, a "1" bit value of the flag can indicate the corresponding item (a listener space, an audio channel, or an audio object) is enabled, and a "0" bit value of the flag can indicate the corresponding item is disabled.

In the embodiment, an audio channel configuration can be a collection of several audio channels, which can be indicated further by the identification indexes of those channels. Alternatively, the audio channel configuration can be a specific audio channel.

In the embodiment, an audio object configuration can be a collection of several audio objects, which can be indicated further by the identification indexes of those objects. Alternatively, the audio object configuration can be a specific audio object.

Table 2 shows another example syntax table representing the space of interest of an audio scene.

TABLE 2

```
AudioScene {
    space_of_interest_type {
        if (space_of_interest_type = listener space) {
            listener_space_count
            if (listener_space_count > 1) {
                listener_space_id {
                    listener_space_flag
                    if (listener_space_flag = true) {
                        listener_space_subtype
                        ...
                    }
                }
                ...
            }
            ...
        }
        if (listener_space_count = 1) {
            listener_space_flag
            if (listener_space_flag = true) {
                listener_space_subtype
                ...
            }
        }
    }
    if (space_of_interest_type = audio channel config) {
        audio_channel_config_count
        if (audio_channel_config_count > 1) {
            audio_channel_config_id {
                ...
            }
            ...
        }
        if (audio_channel_config_count = 1) {
            ...
        }
    }
    if (space_of_interest_type = audio object config) {
        audio_object_config_count
        if (audio_object_config_count > 1) {
            audio_object_config_id {
                ...
            }
            ...
        }
        if (audio_object_config_count = 1) {
            ...
        }
    }
    ...
}
```

II. Flowchart

Figure 5:
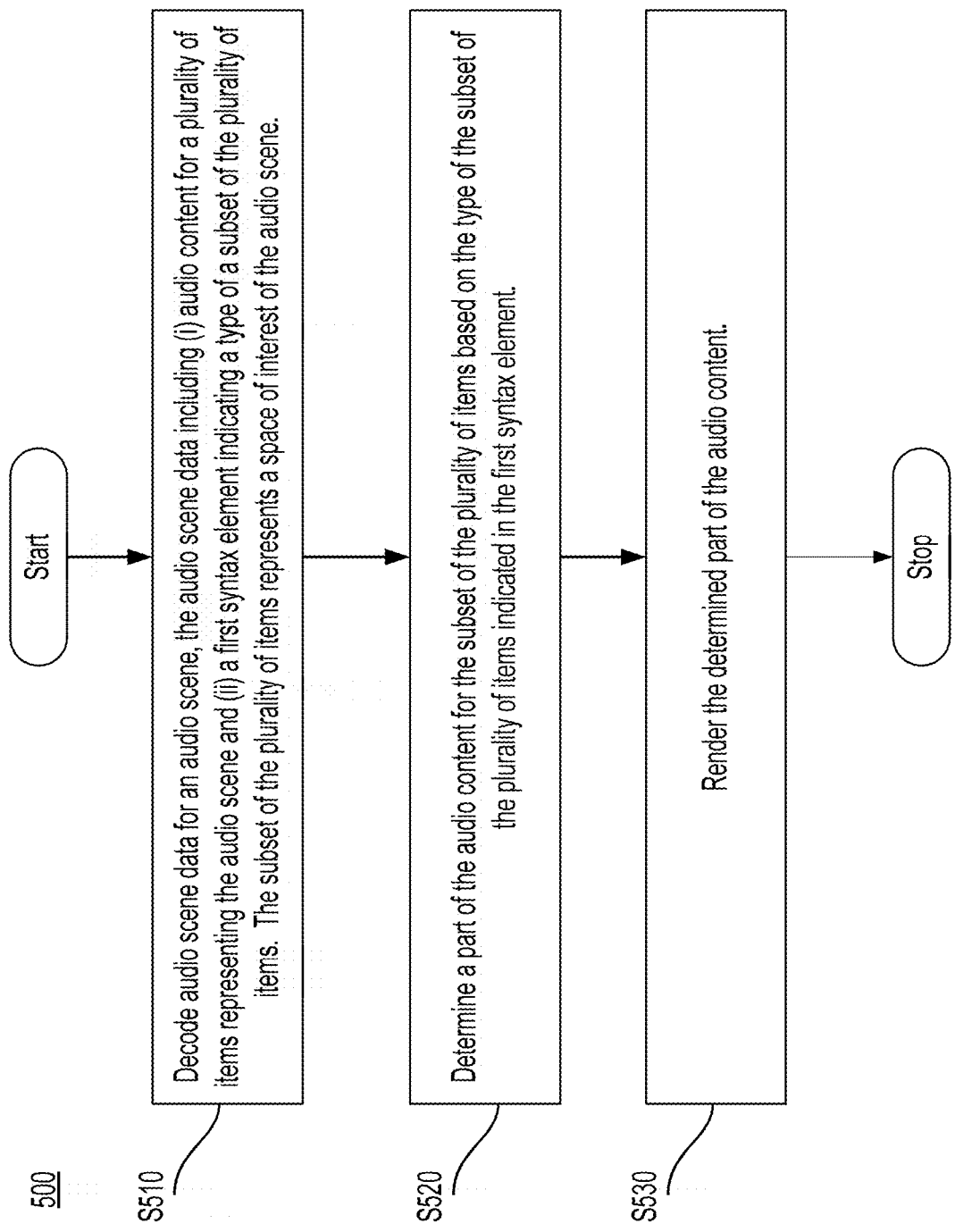
FIG. 5 shows an exemplary flowchart according to an embodiment of the disclosure.
Figure 6:
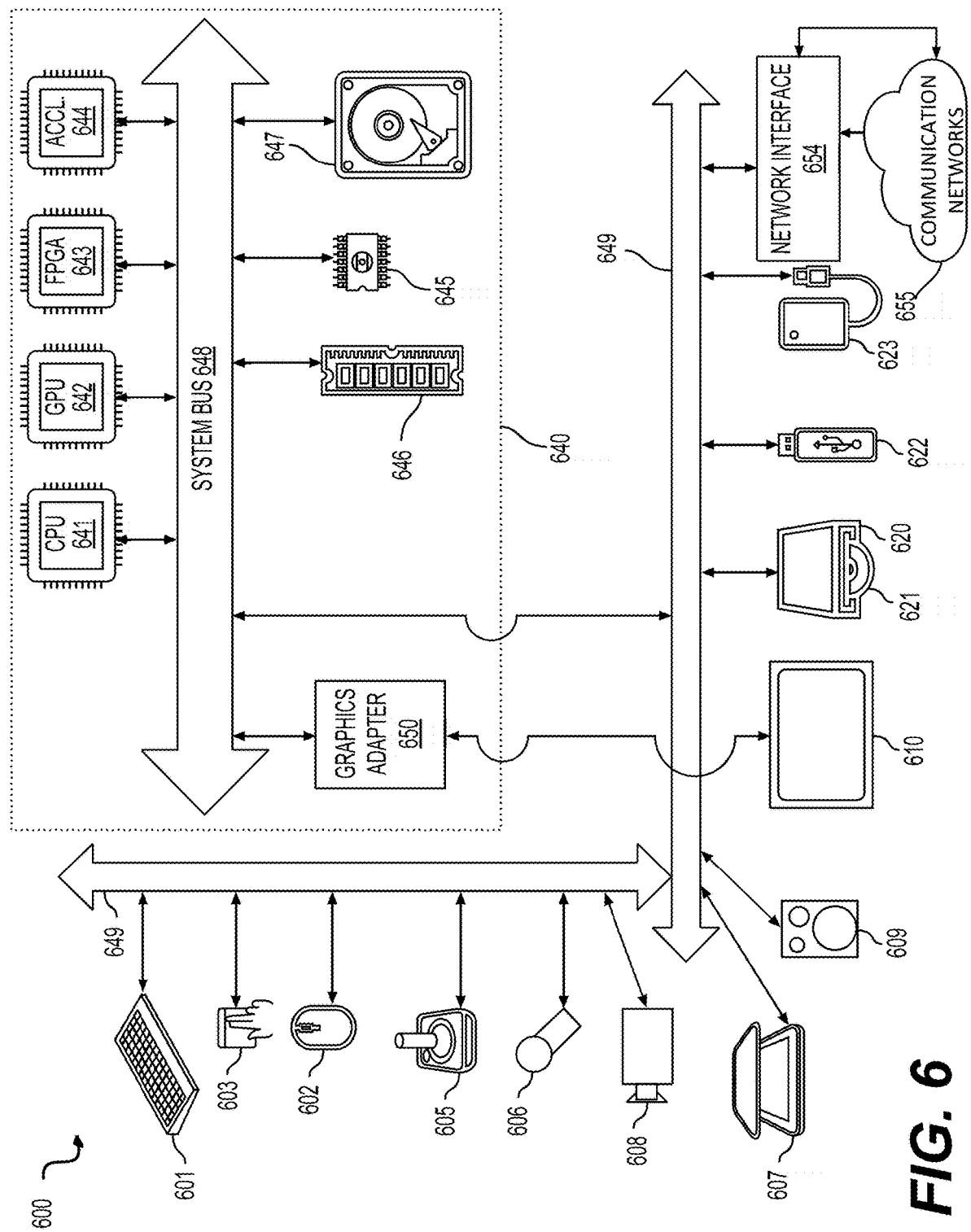
FIG. 6 is a schematic illustration of a computer system according to an embodiment of the disclosure.

FIG. 5 shows a flow chart outlining an exemplary process (500) according to an embodiment of the disclosure. In various embodiments, the process (500) is executed by processing circuitry, such as the processing circuitry as shown in FIG. 6. In some embodiments, the process (500) is implemented in software instructions, thus when the processing circuitry executes the software instructions, the processing circuitry performs the process (500).

The process (500) may generally start at step (S510), where the process (500) decodes audio scene data for an audio scene. The audio scene data includes (i) audio content for a plurality of items representing the audio scene and (ii) a first syntax element indicating a type of a subset of the plurality of items. The subset of the plurality of items represents a space of interest of the audio scene. Then, the process (500) proceeds to step (S520).

At step (S520), the process (500) determines a part of the audio content of the subset of the plurality of items based on the type of the subset of the plurality of items indicated in the first syntax element. Then, the process (500) proceeds to step (S530).

At step (S530), the process (500) renders the determined part of the audio content. Then, the process (500) terminates.

In one embodiment, the first syntax element indicates that the type of the subset of the plurality of items is one of a type associated with a listener space, a type associated with an audio channel configuration, or a type associated with an audio object configuration.

In one embodiment, the audio scene data includes a second syntax element indicating a number of the subset of the plurality of items.

In one embodiment, the second syntax element indicates the number of the subset of the plurality of items is greater than one, and the audio scene data includes a third syntax element indicating an identification index for each of the subset of the plurality of items.

In one embodiment, the first syntax element indicates the type of the subset of the plurality of items is the type associated with the listener space, and the audio scene data includes a fourth syntax element indicating whether a subtype of the listener space is signaled.

In one embodiment, the fourth syntax element indicates that the subtype of the listener space is signaled, and the audio scene data includes a fifth syntax element indicating the subtype of the listener space.

In one embodiment, the fourth syntax element indicates that the subtype of the listener space is not signaled, and the subtype of the listener space is determined based on a video scene.

In one embodiment, the subtype of the listener space is one of a type associated with a sweet spot of the audio scene or a type associated with an auditory space.

III. Computer System

The techniques described above, can be implemented as computer software using computer-readable instructions and physically stored in one or more computer-readable media. For example, FIG. 6 shows a computer system (600) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 6 for computer system (600) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (600).

Computer system (600) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (601), mouse (602), trackpad (603), touch screen (610), data-glove (not shown), joystick (605), microphone (606), scanner (607), and camera (608).

Computer system (600) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (610), data-glove (not shown), or joystick (605), but there can also be tactile feedback devices that do not serve as input devices), audio output devices (such as: speakers (609), headphones (not depicted)), visual output devices (such as screens (610) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted). These visual output devices (such as screens (610)) can be connected to a system bus (648) through a graphics adapter (650).

Computer system (600) can also include human accessible storage devices and their associated media such as optical media including CD/DVD ROM/RW (620) with CD/DVD or the like media (621), thumb-drive (622), removable hard drive or solid state drive (623), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (600) can also include a network interface (654) to one or more communication networks (655). The one or more communication networks (655) can for example be wireless, wireline, optical. The one or more communication networks (655) can further be local, wide-area, metropolitan, vehicular and industrial, real-time, delay-tolerant, and so on. Examples of the one or more communication networks (655) include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (649) (such as, for example USB ports of the computer system (600)); others are commonly integrated into the core of the computer system (600) by attachment to a system bus as described below (for example Ethernet interface into a PC computer system or cellular network interface into a smartphone computer system). Using any of these networks, computer system (600) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (640) of the computer system (600).

The core (640) can include one or more Central Processing Units (CPU) (641), Graphics Processing Units (GPU) (642), specialized programmable processing units in the form of Field Programmable Gate Areas (FPGA) (643), hardware accelerators for certain tasks (644), and so forth. These devices, along with Read-only memory (ROM) (645), Random-access memory (646), internal mass storage such as internal non-user accessible hard drives, SSDs, and the like (647), may be connected through the system bus (648). In some computer systems, the system bus (648) can be accessible in the form of one or more physical plugs to enable extensions by additional CPUs, GPU, and the like. The peripheral devices can be attached either directly to the core's system bus (648), or through a peripheral bus (649). Architectures for a peripheral bus include PCI, USB, and the like.

CPUs (641), GPUs (642), FPGAs (643), and accelerators (644) can execute certain instructions that, in combination, can make up the aforementioned computer code. That computer code can be stored in ROM (645) or RAM (646). Transitional data can also be stored in RAM (646), whereas permanent data can be stored for example, in the internal mass storage (647). Fast storage and retrieve to any of the memory devices can be enabled through the use of cache memory, that can be closely associated with one or more CPU (641), GPU (642), mass storage (647), ROM (645), RAM (646), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (600) and specifically the core (640) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (640) that are of non-transitory nature, such as core-internal mass storage (647) or ROM (645). The software implementing various embodiments of the present disclosure can be stored in such devices and executed by core (640). A computer-readable medium can include one or more memory devices or chips, according to particular needs. The software can cause the core (640) and specifically the processors therein (including CPU, GPU, FPGA, and the like) to execute particular processes or particular parts of particular processes described herein, including defining data structures stored in RAM (646) and modifying such data structures according to the processes defined by the software. In addition or as an alternative, the computer system can provide functionality as a result of logic hardwired or otherwise embodied in a circuit (for example: accelerator (644)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for representing a space of interest of an audio scene, the method comprising:
   decoding audio scene data for the audio scene, the audio scene data including (i) audio content for a plurality of items representing the audio scene, (ii) a first syntax element indicating that a type of a subset of the plurality of items is a type associated with a listener space, and (iii) a second syntax element indicating whether a subtype of the listener space is signaled;
   determining a part of the audio content for the subset of the plurality of items based on the type of the subset of the plurality of items associated with the listener space, as indicated in the first syntax element; and
   rendering the determined part of the audio content.

2. The method of claim 1, wherein the audio scene data includes a third syntax element indicating a number of the subset of the plurality of items.

3. The method of claim 2, wherein the third syntax element indicates the number of the subset of the plurality of items is greater than one, and the audio scene data includes a fourth syntax element indicating an identification index for each of the subset of the plurality of items.

4. The method of claim 1, wherein the second syntax element indicates that the subtype of the listener space is signaled, and the audio scene data includes a fifth syntax element indicating the subtype of the listener space.

5. The method of claim 1, wherein the second syntax element indicates that the subtype of the listener space is not signaled, and the subtype of the listener space is determined based on a video scene.

6. The method of claim 1, wherein the subtype of the listener space is one of a type associated with a sweet spot of the audio scene or a type associated with an auditory space.

7. An apparatus for representing a space of interest of an audio scene, the apparatus comprising:
processing circuitry configured to:
decode audio scene data for the audio scene, the audio scene data including (i) audio content for a plurality of items representing the audio scene, (ii) a first syntax element indicating that a type of a subset of the plurality of items is a type associated with a listener space, and (iii) a second syntax element indicating whether a subtype of the listener space is signaled;
determine a part of the audio content for the subset of the plurality of items based on the type of the subset of the plurality of items associated with the listener space, as indicated in the first syntax element; and
render the determined part of the audio content.

8. The apparatus of claim 7, wherein the audio scene data includes a third syntax element indicating a number of the subset of the plurality of items.

9. The apparatus of claim 8, wherein the third syntax element indicates the number of the subset of the plurality of items is greater than one, and the audio scene data includes a fourth syntax element indicating an identification index for each of the subset of the plurality of items.

10. The apparatus of claim 7, wherein the second syntax element indicates that the subtype of the listener space is signaled, and the audio scene data includes a fifth syntax element indicating the subtype of the listener space.

11. The apparatus of claim 7, wherein the second syntax element indicates that the subtype of the listener space is not signaled, and the subtype of the listener space is determined based on a video scene.

12. The apparatus of claim 7, wherein the subtype of the listener space is one of a type associated with a sweet spot of the audio scene or a type associated with an auditory space.

13. A non-transitory computer-readable storage medium storing instructions, which when executed by at least one processor, cause the at least one processor to perform:
decoding audio scene data for an audio scene, the audio scene data including (i) audio content for a plurality of items representing the audio scene, (ii) a first syntax element indicating that a type of a subset of the plurality of items is a type associated with a listener space, and (iii) a second syntax element indicating whether a subtype of the listener space is signaled;
determining a part of the audio content for the subset of the plurality of items based on the type of the subset of the plurality of items associated with the listener space, as indicated in the first syntax element; and
rendering the determined part of the audio content.

14. The non-transitory computer-readable storage medium of claim 13, wherein the audio scene data includes a third syntax element indicating a number of the subset of the plurality of items.

15. The non-transitory computer-readable storage medium of claim 14, wherein the third syntax element indicates the number of the subset of the plurality of items is greater than one, and the audio scene data includes a fourth syntax element indicating an identification index for each of the subset of the plurality of items.

* * * * *